United States Patent
Um et al.

(10) Patent No.: US 12,169,338 B2
(45) Date of Patent: Dec. 17, 2024

(54) DISPLAY PANEL AND DISPLAY DEVICE

(71) Applicant: TCL CHINA STAR OPTOELECTRONICS TECHNOLOGY CO., LTD., Shenzhen (CN)

(72) Inventors: Yoonsung Um, Shenzhen (CN); Jing Liu, Shenzhen (CN); Kaili Qu, Shenzhen (CN); Chuwei Liang, Shenzhen (CN); Ziqi Liu, Shenzhen (CN); Ting Li, Shenzhen (CN); Lintao Liu, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 787 days.

(21) Appl. No.: 17/278,712

(22) PCT Filed: Mar. 19, 2021

(86) PCT No.: PCT/CN2021/081673
§ 371 (c)(1),
(2) Date: Mar. 23, 2021

(87) PCT Pub. No.: WO2022/088589
PCT Pub. Date: May 5, 2022

(65) Prior Publication Data
US 2022/0308407 A1   Sep. 29, 2022

(30) Foreign Application Priority Data

Oct. 30, 2020   (CN) .......................... 202011194011.X
Mar. 4, 2021    (CN) .......................... 202110238942.3

(51) Int. Cl.
*G02F 1/1343* (2006.01)
*G02F 1/1362* (2006.01)
*G09G 3/36* (2006.01)

(52) U.S. Cl.
CPC .... *G02F 1/134345* (2021.01); *G02F 1/13439* (2013.01); *G02F 1/136222* (2021.01);
(Continued)

(58) Field of Classification Search
None
See application file for complete search history.

(56) References Cited

U.S. PATENT DOCUMENTS

| | | | | |
|---|---|---|---|---|
| 2008/0297524 A1* | 12/2008 | Huang | ................. | G09G 3/3648 345/530 |
| 2018/0004057 A1* | 1/2018 | Kim | ................. | G02F 1/136213 |
| 2018/0342214 A1* | 11/2018 | Ying | ................. | G02F 1/136286 |

FOREIGN PATENT DOCUMENTS

| CN | 1645197 A | 7/2005 |
|---|---|---|
| CN | 101840678 A | 9/2010 |

(Continued)

*Primary Examiner* — Richard H Kim
(74) *Attorney, Agent, or Firm* — The Roy Gross Law Firm, LLC; Roy Gross

(57) ABSTRACT

The present application discloses a display panel and a display device, which include a plurality of sub-pixels, and each of sub-pixel includes a first pixel electrode with a first pixel voltage and a second pixel electrode with a second pixel voltage; when the sub-pixels are in a low-gray-scale state, the second pixel voltage and the first pixel voltage have a first ratio; when the sub-pixels are in a high-gray-scale state, the second pixel voltage and the first pixel voltage have a second ratio, and the second ratio is greater than the first ratio.

18 Claims, 4 Drawing Sheets

(52) U.S. Cl.
CPC ..... *G02F 1/136286* (2013.01); *G09G 3/3607* (2013.01); *G09G 3/3688* (2013.01)

(56) References Cited

FOREIGN PATENT DOCUMENTS

| | | |
|---|---|---|
| CN | 103400563 A | 11/2013 |
| CN | 106855668 A | 6/2017 |
| CN | 107272237 A | 10/2017 |
| KR | 20100066654 A | 6/2010 |

* cited by examiner

DISPLAY PANEL AND DISPLAY DEVICE

CROSS REFERENCE TO RELATED APPLICATIONS

This application is a National Phase of PCT Patent Application No. PCT/CN2021/081673 having International filing date of Mar. 19, 2021, which claims the benefit of priority of Chinese Patent Application No. 202110238942.3, filed Mar. 4, 2021 and Chinese Patent Application No. 202011194011.X, filed Oct. 30, 2020 the contents of which are all incorporated herein by reference in their entirety.

BACKGROUND OF INVENTION

Field of Invention

The present application relates to the field of display technology, and in particular, to a display panel and a display device including the display panel.

Description of Prior Art

As the display panel technology becomes more and more mature, liquid crystal display panels have been widely used in various large, medium and small display devices due to their light weight, small size, and thin thickness. At present, the performance requirements of liquid crystal display products on the market are moving towards characteristics such as high contrast and wide viewing angles. At present, there are three main technical methods for achieving wide viewing angle requirements: twisted nematic liquid crystal display devices, in-plane switching liquid crystal display devices, and multi-domain vertical alignment mode liquid crystal display devices. The multi-domain vertical alignment mode liquid crystal display devices have become one of the mainstream liquid crystal display devices in the market due to their superiority in mass production and display characteristics.

The traditional vertical alignment mode liquid crystal display panel has a large difference in the birefringence of the liquid crystal molecules, which results in a serious color shift at large-viewing angle. In the prior art, a traditional 4-domain sub-pixel is divided into a main area and a sub area to form 8-domain sub-pixels, so that the 4 domains in the main area and the 4 domains in the sub-area in a same one of the sub-pixels have liquid crystal molecules of different rotation angles, which can effectively improve the color shift.

At present, the mainstream method to realize 8-domain sub-pixels includes 3T technology (that is, including main TFT, sub TFT, and share TFT, wherein the main TFT and sub TFT have the same size to charge the main and sub areas, respectively, and meanwhile, the share TFT provides sub area with a leakage current to make voltages of the main and sub areas have a certain difference, so that the liquid crystal molecules corresponding to the main and sub areas have different liquid crystal deflection angles). Referring to FIG. 1, FIG. 1 is a schematic diagram of the LCS-gray scale curve in the existing display panel, wherein LCS is a ratio of a pixel voltage in the sub area to a pixel voltage in the main area. The LCS value is close to 0.8 measured at a low gray level (0 gray level), the LCS value is close to 0.8; the LCS value is close to 0.75 measured at a high gray level (255 gray level), so that the sub-pixels have high LCS at the low gray level. As such, the difference in the deflection angle of the liquid crystal molecules corresponding to the main and sub areas is small, which causes the display panel at low gray levels to have a limited viewing angle range, and the limited viewing angle range is not conducive to display. In addition, the sub-pixels have low LCS at high gray levels, so that the difference in the deflection angles of the liquid crystal molecules corresponding to the main and sub areas is large, but the transmittance will be reduced, which is also not conducive to display. Therefore, it is difficult for the prior art to balance the transmittance and viewing angle of the display panel at low gray levels and high gray levels, respectively.

SUMMARY OF INVENTION

Embodiments of the present application provide a display panel and a display device, which can solve the technical problem that the transmittance and the viewing angle cannot be balanced in the prior art.

In order to solve the above technical problems, an embodiment of the present application provides a display panel, which includes:

a plurality of data signal lines configured to provide pixel voltages;

a plurality of shared signal lines configured to provide shared voltage signals; and a plurality of sub-pixels, each of the sub-pixels including a first pixel electrode and a second pixel electrode, wherein the first pixel electrode is electrically connected to one of the data signal lines to have a first pixel voltage, and the second pixel electrode is electrically connected to one of the data signal lines and one of the shared signal lines to have a second pixel voltage; and when the sub-pixels are in a low-gray-scale state, the second pixel voltage and the first pixel voltage have a first ratio; when the sub-pixels are in a high-gray-scale state, the second pixel voltage and the first pixel voltage have a second ratio, and the second ratio is greater than the first ratio.

In an embodiment of the present application, when the pixel voltages are positive, the shared voltage signals have a first voltage; and when the pixel voltages are negative, the shared voltage signals have a second voltage, and the first voltage is different from the second voltage.

In an embodiment of the present application, the first voltage is less than the second voltage.

In an embodiment of the present application, the first voltage is 4V and the second voltage is 12V.

In an embodiment of the present application, when a gray level of the sub-pixels is greater than 70 gray levels, a ratio of the second pixel voltage to the first pixel voltage increases as the gray level of the sub-pixels increases.

In an embodiment of the present application, the display panel further includes a common electrode layer, the common electrode layer has a first common voltage; when the pixel voltages are positive, an absolute value of a difference between the second pixel voltage and the first common voltage is a third value; and when the pixel voltages are negative, an absolute value of a difference between the second pixel voltage and the first common voltage is a four value, and the third value is equal to the fourth value.

In an embodiment of the present application, the first common voltage includes a direct current signal.

In an embodiment of the present application, the display panel includes an array substrate, a color filter substrate arranged opposite to the array substrate, and a liquid crystal layer provided between the array substrate and the color filter substrate; the array substrate includes a pixel electrode layer, the pixel electrode layer includes the first pixel electrode and the second pixel electrode in a same layer, the color filter substrate includes the common electrode layer, and the pixel electrode layer is arranged opposite to the common electrode layer.

In an embodiment of the present application, each of the first pixel electrode and the second pixel electrode is distributed axially symmetrically along one of the shared signal lines.

In an embodiment of the present application, the display panel further includes a driving module, and the shared signal lines are electrically connected to the driving module to transmit the shared voltage signals.

According to the above object of the present application, a display device is provided, the display device includes a backlight source and a display panel, the backlight source is connected to the display panel and configured to provide a backlight for the display panel;

wherein the display panel includes:

a plurality of data signal lines configured to provide pixel voltages;

a plurality of shared signal lines configured to provide shared voltage signals; and a plurality of sub-pixels, each of the sub-pixels including a first pixel electrode and a second pixel electrode, wherein the first pixel electrode is electrically connected to one of the data signal lines to have a first pixel voltage, and the second pixel electrode is electrically connected to one of the data signal lines and one of the shared signal lines to have a second pixel voltage; and when the sub-pixels are in a low-gray-scale state, the second pixel voltage and the first pixel voltage have a first ratio; when the sub-pixels are in a high-gray-scale state, the second pixel voltage and the first pixel voltage have a second ratio, and the second ratio is greater than the first ratio.

In an embodiment of the present application, when the pixel voltages are positive, the shared voltage signals have a first voltage; and when the pixel voltages are negative, the shared voltage signals have a second voltage, and the first voltage is different from the second voltage.

In an embodiment of the present application, the first voltage is less than the second voltage.

In an embodiment of the present application, the first voltage is 4V and the second voltage is 12V.

In an embodiment of the present application, when a gray level of the sub-pixels is greater than 70 gray levels, a ratio of the second pixel voltage to the first pixel voltage increases as the gray level of the sub-pixels increases.

In an embodiment of the present application, the display panel further includes a common electrode layer, the common electrode layer has a first common voltage; when the pixel voltages are positive, an absolute value of a difference between the second pixel voltage and the first common voltage is a third value; and when the pixel voltages are negative, an absolute value of a difference between the second pixel voltage and the first common voltage is a four value, and the third value is equal to the fourth value.

In an embodiment of the present application, the first common voltage includes a direct current signal.

In an embodiment of the present application, the display panel includes an array substrate, a color filter substrate arranged opposite to the array substrate, and a liquid crystal layer provided between the array substrate and the color filter substrate; the array substrate includes a pixel electrode layer, the pixel electrode layer includes the first pixel electrode and the second pixel electrode in a same layer, the color filter substrate includes the common electrode layer, and the pixel electrode layer is arranged opposite to the common electrode layer.

In an embodiment of the present application, each of the first pixel electrode and the second pixel electrode is distributed axially symmetrically along one of the shared signal lines.

In an embodiment of the present application, the display panel further includes a driving module, and the shared signal lines are electrically connected to the driving module to transmit the shared voltage signals.

Compared with the prior art, in this application, when the sub-pixel is in a low gray-scale state, the second pixel voltage has a first ratio to the first pixel voltage; when the sub-pixel is in a high gray-scale state, the second pixel voltage has a second ratio to the first pixel voltage, and the second ratio is greater than the first ratio, so that the LCS of the display panel is lower at low gray scales, that is, when the display panel is displayed at low gray scales, the difference in the deflection angles of the liquid crystal molecules corresponding to the first pixel electrode and the second pixel electrode is large, so that the display panel can obtain a larger range of viewing angles. In the high gray scale, the LCS is high, that is, when the display panel is displayed at high gray scales, the difference in the deflection angles of the liquid crystal molecules corresponding to the first pixel electrode and the second pixel electrode is small, so that the transmittance of the sub-pixels tends to be uniform, thereby obtaining a greater transmittance, and improving the display effect of the display panel.

BRIEF DESCRIPTION OF DRAWINGS

The technical solutions and other beneficial effects of the present application will be made obvious by describing the specific implementation manners of the present application in detail below in conjunction with the accompanying drawings.

DETAILED DESCRIPTION OF PREFERRED EMBODIMENTS

Figure 1:
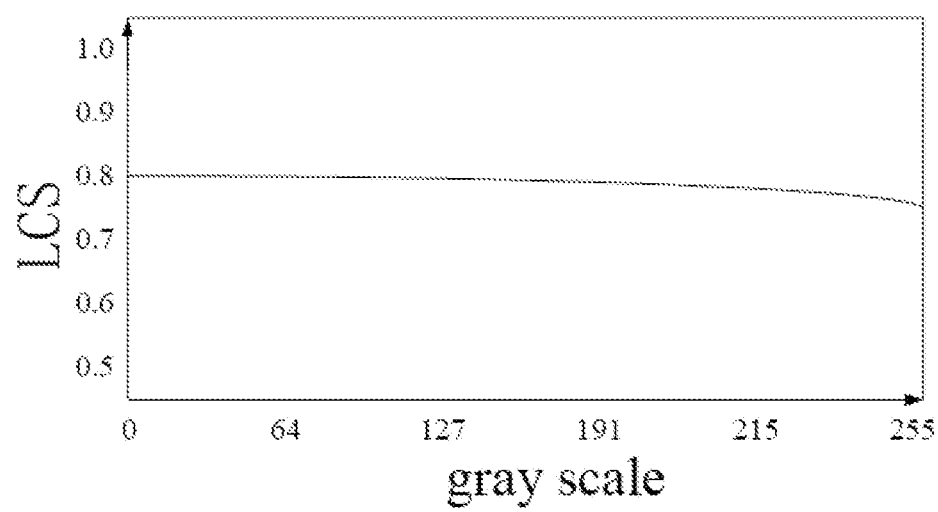
FIG. 1 is a schematic diagram of the existing LCS-gray scale curve.

The technical solutions in the embodiments of the present application will be clearly and completely described in the following with reference to the accompanying drawings in the embodiments. It is apparent that the described embodiments are only a part of the embodiments of the present application, and not all of them. All other embodiments obtained by a person skilled in the art based on the embodiments of the present application without creative efforts are within the scope of the present application.

In the description of this application, it should be understood that the terms "center", "longitudinal", "transverse", "length", "width", "thickness", "upper", "lower", "front", "Rear", "left", "right", "vertical", "horizontal", "top", "bottom", "inside", "outside", "clockwise", "counterclockwise", and the like are based on the orientation or positional relationship shown in the drawings, and is merely for the convenience of describing the present invention and simplifying the description, rather than indicating or implying that the device or element referred to must have a specific orientation, structure and operation in a specific orientation, which should not be construed as limitations on the present invention. In addition, the terms "first" and "second" are used for descriptive purposes only, and cannot be understood as indicating or implying relative importance or implicitly indicating the number of technical features indicated. Therefore, the features defined as "first" and "second" may explicitly or implicitly include one or more of the features. In the description of the present application, the meaning of "a plurality" is two or more, unless specifically defined otherwise.

In the description of this application, it should be noted that the terms "installation", "connected", and "connected" should be understood in a broad sense unless explicitly stated and limited otherwise. For example, it can be a fixed connection, a detachable connection, or an integral connection; it can also be a mechanical connection or an electrical connection; it can be a direct connection; or it can be an indirect connection through an intermediate medium; or it can be a communication between two components.

In the present invention, unless otherwise expressly stated and limited, the formation of a first feature over or under a second feature in the description that follows may include embodiments in which the first and second features are formed in direct contact, and may also include embodiments in which additional features may be formed between the first and second features, such that the first and second features may not be in direct contact. Moreover, the first feature "above", "over" and "on" the second feature includes the first feature directly above and above the second feature, or merely indicating that the first feature is at a level higher than the second feature. The first feature "below", "under" and "beneath" the second feature includes the first feature directly below and obliquely below the second feature, or merely the first feature has a level lower than the second feature.

The following disclosure provides many different embodiments or examples for realizing different structures of the present application. To simplify the disclosure of the present application, the components and settings of specific examples are described below. Of course, they are only examples and are not intended to limit the application. In addition, the present application may repeat reference numerals and/or reference letters in different examples. Such repetition is for the purpose of simplification and clarity, and does not indicate the relationship between the various embodiments and/or settings discussed. In addition, this application provides examples of various specific processes and materials, but those of ordinary skill in the art may be aware of the applications of other processes and/or the use of other materials.

Embodiments of the present application provide a display panel and a display device. The existing vertical alignment mode liquid crystal display panel cab be referred to FIG. 1, which is a schematic diagram of the LCS-gray scale curve in the existing display panel, wherein LCS is a ratio of the pixel voltage in the sub area to the pixel voltage in the main area, the LCS value is close to 0.8 measured at a low gray level (0 gray level); and the LCS value is close to 0.75 at a high gray level (255 gray level), which makes the sub pixel has a high LCS at a low gray level, so that the difference in the deflection angle of the liquid crystal molecules corresponding to the main and sub areas is small, which causes the display panel at low gray levels to have a limited viewing angle range, and the limited viewing angle range is not conducive to display. In addition, the sub-pixels have low LCS at high gray levels, so that the difference in the deflection angles of the liquid crystal molecules corresponding to the main and sub areas is large, but the transmittance will be reduced, which is also not conducive to display. Therefore, it is difficult for the prior art to balance the transmittance and viewing angle of the display panel at low gray levels and high gray levels, respectively.

Figure 2:
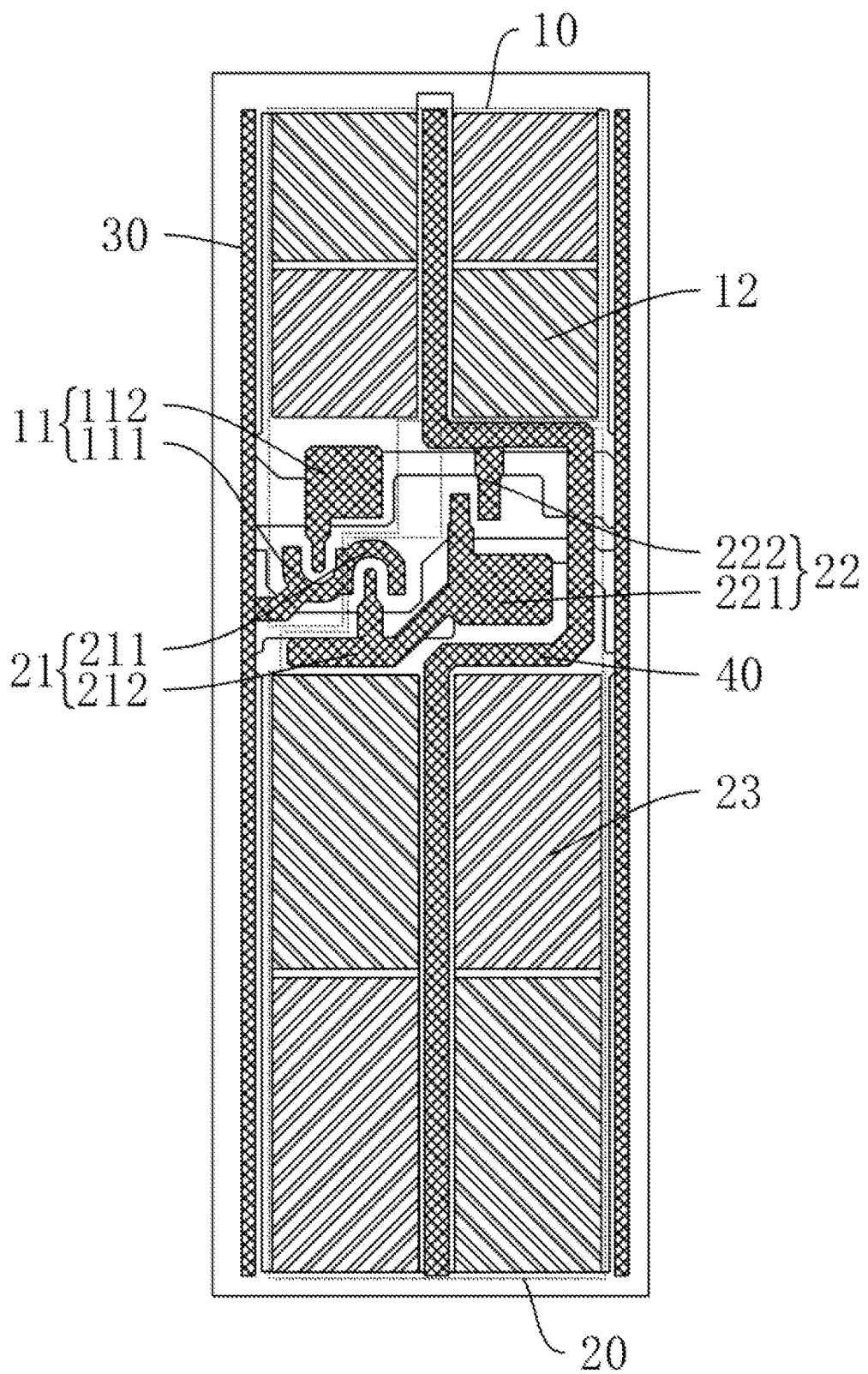
FIG. 2 is a schematic structural diagram of a sub-pixel provided by an embodiment of the application.

In order to solve the above technical problem, an embodiment of the present application provides a display panel. Referring to FIG. 2, the display panel includes a plurality of data signal lines 30, a plurality of shared signal lines 40, and a plurality of sub-pixels. FIG. 2 shows the structural diagram of one of the sub-pixels as an example for illustration, wherein a plurality of the data signal lines 30 are used to provide pixel voltages Vs, and a plurality of the shared signal lines 40 are used to provide shared voltage signals Vg. Each of the sub-pixels includes a first pixel electrode 12 and a second pixel electrode 23.

The first pixel electrode 12 is electrically connected to the data signal line 30 to have a first pixel voltage, and the second pixel electrode 23 is electrically connected to the data signal line 30 and the shared signal line 40 to have a second pixel voltage. When the sub-pixel is in a low gray-scale state, the second pixel voltage and the first pixel voltage have a first ratio; and when the sub-pixel is in a high gray-scale state, the second pixel voltage and the first pixel voltage have a second ratio, and the second ratio is greater than the first ratio.

In an embodiment of the present application, the second ratio is greater than the first ratio, so that the LCS of the display panel is lower when the display panel is at a low gray level, that is, when the display panel is displayed at a low gray level, the difference in the deflection angle of the liquid crystal molecules corresponding to the first pixel electrode 12 and the second pixel electrode 23 is large, so that the display panel can obtain a larger range of viewing angles; while the LCS is high at a high gray level, that is, when the second pixel electrode 23 is displayed at a high gray level, the difference in the deflection angle of the liquid crystal molecules corresponding to the first pixel electrode 12 and the second pixel electrode 23 is small, so that the transmittance of the sub-pixels tends to be uniform, thereby obtaining a greater transmittance to meet the requirements for better viewing angles at low gray levels and higher transmittance at high gray levels of the display panel, which improves the display effect of the display panel.

Figure 3:
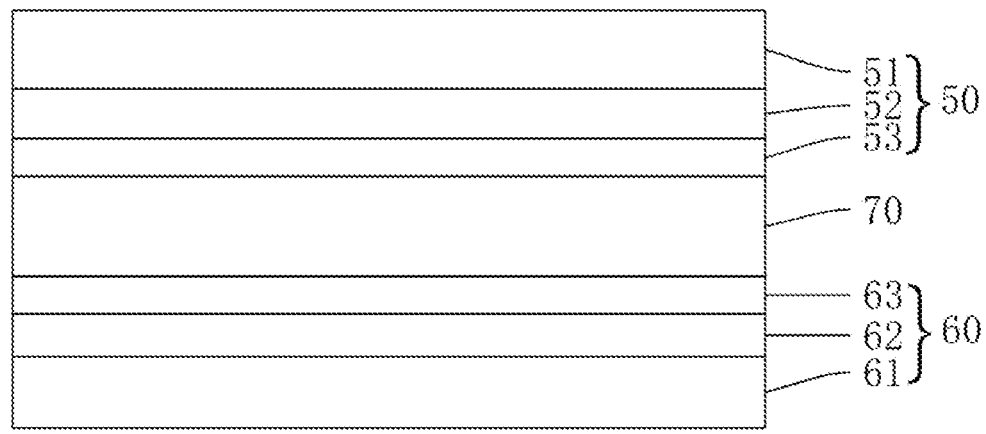
FIG. 3 is a schematic structural diagram of a display panel provided by an embodiment of the application.
Figure 4:
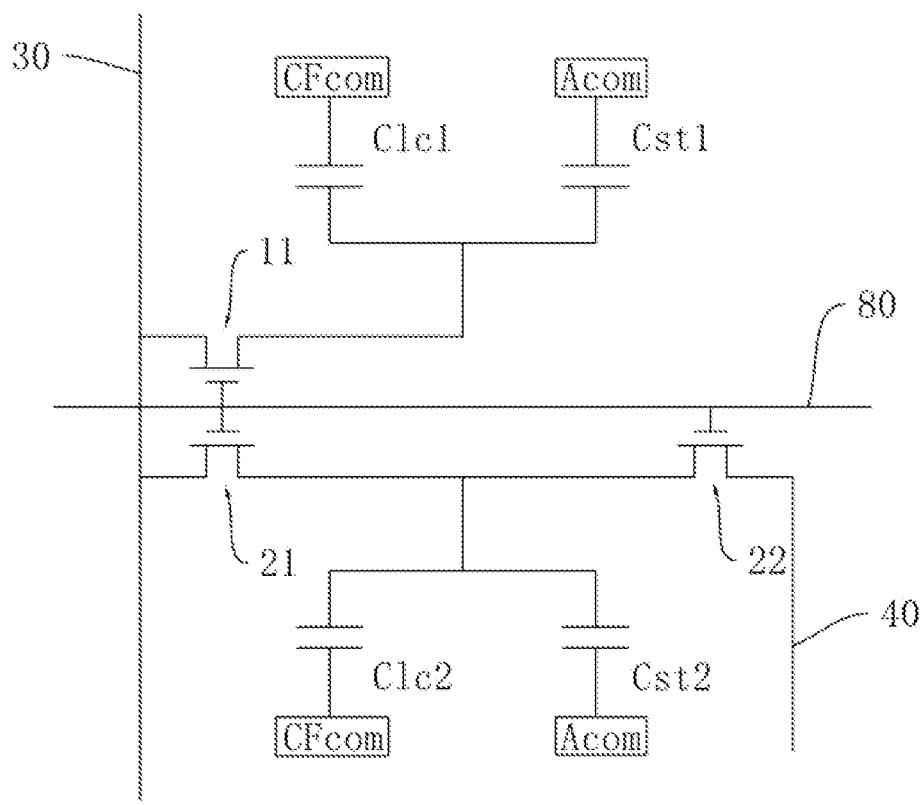
FIG. 4 is an equivalent circuit diagram of a sub-pixel provided by an embodiment of the application.

Further, referring to FIG. 2, FIG. 3, and FIG. 4, in an embodiment of the present application, the display panel includes a vertical alignment mode liquid crystal display panel, and the display panel includes an array substrate 60 and a color filter substrate 50 arranged oppositely, and a liquid crystal layer 70 disposed between the array substrate 60 and the color filter substrate 50, wherein the array substrate 60 may be a thin film transistor array substrate (TFT array substrate); the material of the array substrate 60 may be a hard substrate such as a glass substrate or other non-hard materials. The color filter substrate 50 may be a color filter substrate (CF substrate); the material of the color filter substrate 50 may be a hard substrate such as a glass substrate or other non-hard materials. The color filter substrate 50 is arranged above the array substrate 60, the array substrate 60 and the color filter substrate 50 can be arranged by cell-assembling, and the liquid crystal layer 70 is arranged between the array substrate 60 and the color filter substrate 50. When the display panel is not energized, a long axis of the liquid crystal molecules in the liquid crystal layer 70 is perpendicular to the array substrate 60 and the color filter substrate 50; and when the display panel is energized, the long axis of the liquid crystal molecules in the liquid crystal layer 70 is inclined at a certain angle with respect to the array substrate 60 and the color filter substrate 50.

Further, the color filter substrate 50 may include a first base substrate 51. The first base substrate 51 may be a hard base substrate made of glass material; or the first base substrate 51 may also be a soft base substrate made of thin film material. The color filter layer 52 and a common electrode layer 53 are sequentially arranged on the first base substrate 51.

Further, the array substrate 60 may include a second base substrate 61. The second base substrate 61 may be a hard base substrate made of glass material; or the second base substrate 61 may also be a soft base substrate made of thin film material. The thin film transistor array layer 62 and a pixel electrode layer 63 are sequentially arranged on the second base substrate 61.

The pixel electrode layer 63 and the common electrode layer 53 are disposed opposite to each other, and the liquid crystal layer 70 is located between the pixel electrode layer 63 and the common electrode layer 53, when the pixel electrode layer 63 and the common electrode layer 53 are energized, an electric field is generated between the pixel electrode layer 63 and the common electrode layer 53, and the liquid crystal molecules in the liquid crystal layer 70 are deflected under the action of the electric field.

In view of above, in an embodiment of the present application, the display panel includes a plurality of sub-pixels, and the diagram provided in an embodiment of the present application only shows a structure of one of the sub-pixels as an example, and each of the sub-pixels includes a first sub-pixel 10 and a second sub-pixel 20. Further, the first sub-pixel 10 includes a first thin film transistor 11 and a first pixel electrode 12, and the second sub-pixel 20 includes a second thin film transistor 21, a shared thin film transistor 22, and the second pixel electrode 23, wherein the first thin film transistor 11, the second thin film transistor 21, and the shared thin film transistor 22 are all located on the thin film transistor array layer 62, the first pixel electrode 12 and the second pixel electrodes 23 are all located on the pixel electrode layer 63, that is, electric fields are formed between the first pixel electrode 12 and the common electrode layer 53 and between the second pixel electrode 23 and the common electrode layer 53 in each of the sub-pixels, to control the deflection of the liquid crystal molecules in the liquid crystal layer 70. Specifically, the first sub-pixel 10 further includes a first liquid crystal capacitor Clc1 and a first storage capacitor Cst1, the second sub-pixel 20 further includes a second liquid crystal capacitor Clc2 and a second storage capacitor Cst2, the first liquid crystal capacitor Clc1 may be composed of the first pixel electrode 12 and the common electrode layer 53, the second liquid crystal capacitor Clc2 may be composed of the second pixel electrode 23 and the common electrode layer 53, and the common electrode layer 53 is electrically connected to CFcom, so that the common electrode layer 53 has a first common voltage, and then an electric field is formed in the first liquid crystal capacitor Clc1 and the second liquid crystal capacitor Clc2 to control the deflection of the liquid crystal molecules in the liquid crystal layer 70.

One end of the first storage capacitor Cst1 and one end of the second storage capacitor Cst2 are electrically connected to the drain 112 of the first thin film transistor 11 and the drain 212 of the second thin film transistor 21, respectively. The other ends of the capacitor Cst1 and the second storage capacitor Cst2 are electrically connected to Acom (the second common voltage applied to the array substrate 60).

Further, in the first sub-pixel 10, the source 111 of the first thin film transistor 11 is electrically connected to the data signal line 30, the drain 112 of the first thin film transistor 11 is electrically connected to the first pixel electrode 12, and the gate of the first thin film transistor 11 is electrically connected to the scan signal line 80, such that the first thin film transistor 11 is turned on under driving by the scan signal in the scan signal line 80, and the first thin film transistor 11 transmits the pixel voltage Vs in the data signal line 30 to the first pixel electrode 12, making the first pixel electrode 12 have the first pixel voltage.

In the second sub-pixel 20, the source 211 of the second thin film transistor 21 is electrically connected to the data signal line 30, the drain 212 of the second thin film transistor 21 is electrically connected to the second pixel electrode 23, the gate of the second thin film transistor 21 is electrically connected to the scan signal line 80, such that the second thin film transistor 21 is turned on under driving by the scan signal in the scan signal line 80, such that the second thin film transistor 21 transmits the pixel voltage Vs in the data signal line 30 to the second pixel electrode 23.

The source 221 of the shared thin film transistor 22 is electrically connected to the drain 212 of the second thin film transistor 21, the drain 222 of the shared thin film transistor 22 is electrically connected to the shared signal line 40, and the gate of the shared thin film transistor 22 is electrically connected to the scan signal line 80, such that the shared thin film transistor 22 is turned on under driving by the scan signal in the scan signal line 80, and the shared thin film transistor 22 discharges the second thin film transistor 21 according to the shared voltage signal Vg, and then leaks the second sub-pixel 20, so that the second sub-pixel electrode 23 has a second pixel voltage.

Further, the display panel further includes a driving module, and the shared signal line 40 is electrically connected to the driving module to transmit the shared voltage signal Vg to the shared thin film transistor 22.

The first pixel electrode 12 is equally divided into four areas, which are distributed axially symmetrically with respect to the shared signal line 40, and the first pixel electrode 12 includes two areas on each of opposite sides of the shared signal line 40. The second pixel electrode 23 is equally divided into four areas, which are distributed axially symmetrically with respect to the shared signal line 40, and the second pixel electrode 23 includes two areas on each of opposite sides of the shared signal line 40, in order to form an eight-domain pixel structure provided by an embodiment of the present application.

It should be noted that the size of the first thin film transistor 11 and the size of the second thin film transistor 21 are the same, so as to transmit the pixel voltage Vs to the first sub-pixel 10 and the second sub-pixel 20, respectively, making the first pixel electrode 12 have the first pixel voltage. Meanwhile, in order to achieve the expansion of the viewing angle range and improve the color shift phenomenon, the shared thin film transistor 22 discharges the second thin film transistor 21 according to the shared voltage signal Vg, and leaks the second sub-pixel 20, so that the second sub-pixel electrode 23 has a second pixel voltage. As such, there is a difference between the first pixel voltage and the second pixel voltage, so that the deflection angle of the liquid crystal molecules corresponding to the first sub-pixel 10 is different from the deflection angle of the liquid crystal molecules corresponding to the second sub-pixel 20, thereby expanding the viewing angle range.

In an embodiment of the present application, when the pixel voltage Vs has positive polarity, that is, when the electrical property is positive, the shared voltage signal Vg is the first voltage. When the pixel voltage Vs has negative polarity, that is, when the electrical property is negative, the shared voltage signal Vg is a second voltage, and the first voltage is different from the second voltage, so that the second ratio is greater than the first ratio, which can transmit an alternating current square wave signal to the shared signal line 40.

Figure 5:
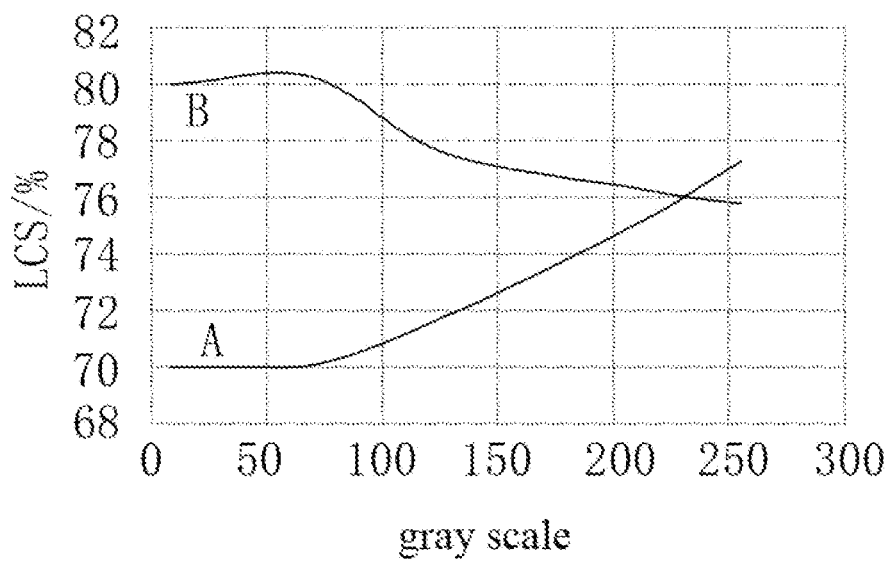
FIG. 5 is a schematic diagram of a LCS-gray scale curve provided by an embodiment of the application.

Referring to FIG. 5, the curve B is a relationship curve between LCS and gray scale obtained by power supplying the shared signal line 40 with an existing power supply method. Specifically, a direct current signal is applied to the shared signal line 40, then the shared voltage signal Vg is taken to be constant at 9V, and the curve B is obtained by simulation, wherein the sub-pixel has a high LCS of about 80% at a low gray level, and the sub-pixel has a low LCS of about 76% at a high gray level, thus failing to meet the requirements of LCS being low at low gray scales (with better viewing angle) and being high at high gray scales (with higher transmittance).

Figure 6:
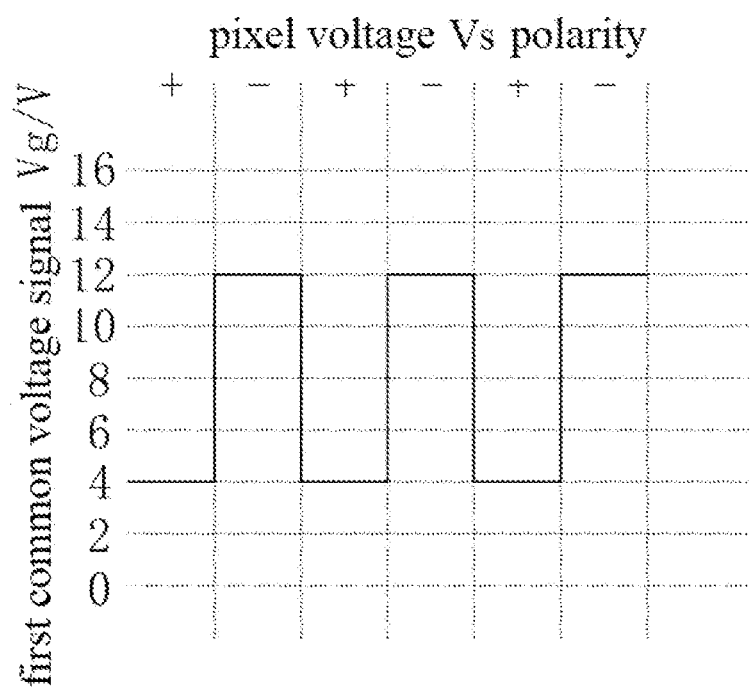
FIG. 6 is a waveform diagram of a shared voltage signal-pixel voltage provided by an embodiment of the application.

In an embodiment of the present application, the first voltage is different from the second voltage. Specifically, the first voltage is smaller than the second voltage. Referring to FIG. 5 and FIG. 6, the first voltage is taken as 4V, the second voltage is taken as 12V, and a curve A is obtained by simulation, wherein the sub-pixel has a low LCS of about 70% at a low gray level, and has a high LCS of about 77% at a high gray level 77%, thus meeting the requirements of LCS being low at low gray scales (with better viewing angle) and being high at high gray scales (with higher transmittance). Further, when the gray level of the sub-pixel is greater than 70 gray levels, the ratio of the second pixel voltage to the first pixel voltage (i.e., LCS) increases as the gray level of the sub-pixel increases.

In addition, the common electrode layer 53 has the first common voltage, and the first common voltage is a direct current signal, which is a constant value. However, in the prior art, the shared signal line 40 adopts a direct current power supply mode, and when the pixel voltages Vs is positive and when the pixel voltages Vs is negative, the second thin film transistor 21 is discharged through a constant shared voltage signal Vg, and the form is single, which will make the absolute value of the difference between the second pixel voltage and the first common voltage is greater when the pixel voltage Vs is positive and when the pixel voltage Vs is negative, which will impacting the symmetry of the second pixel voltage when the pixel voltage Vs is positive and when the pixel voltage Vs is negative, thus reducing the display effect.

In an embodiment of the present application, the first voltage is different from the second voltage. By selecting the appropriate first voltage and the second voltage, making the absolute value of the difference between the second pixel voltage and the first common voltage be a third value when the pixel voltage Vs is positive, and making the absolute value of the difference between the second pixel voltage and the first common voltage be a fourth value when the pixel voltage Vs is negative, and the third value is equal to the fourth value, that is, the second pixel voltage has symmetry when the pixel voltage Vs is positive and when the pixel voltage Vs is negative, so as to improve the display uniformity of the display panel, further improving the display effect. Further, the values of the first voltage and the second voltage, that is, the shared voltage signal Vg, can be obtained by simulation based on the pixel voltage Vs and an IV curve of the second thin film transistor 21, which is not particularly limited herein.

Therefore, embodiments of the present application can realize a large difference in the deflection angle between the liquid crystal molecules corresponding to the first sub-pixel 10 and the liquid crystal molecules corresponding to the second sub-pixel 20 when the display panel is displayed at low gray scales, so that the display panel has a larger viewing angle range; and realize a smaller difference in the deflection angle between the liquid crystal molecules corresponding to the first sub-pixel 10 and the liquid crystal molecules corresponding to the second sub-pixel 20 when the display panel is displayed at high gray scales, so that the transmittance of the second sub-pixel 20 is approximately the same as the transmittance of the first sub-pixel 10, thereby obtaining a larger transmittance, and improving the display effect of the display panel. In an embodiment of the present application, by selecting the appropriate shared to voltage signal Vg, the symmetry of the second pixel voltage is ensured when the pixel voltage Vs has a positive polarity and a negative polarity, respectively.

In addition, an embodiment of the present application also provides a display device, and the display device includes the display panel described in any of the foregoing embodiments and a backlight source connected to at least one side of the display panel to provide backlight for the display panel.

In summary, embodiments of the present application provide a display panel and a display device having the display panel. By transmitting different signals to the shared signal line 40 when the pixel voltage Vs is in the positive polarity and the negative polarity, respectively, the display panel has a low LCS when the display panel displays a low gray scale, so as to expand the viewing angle range of the display panel, and has a high LCS when the display panel displays a high gray scale, so as to improve transmittance of the display panel, while maintaining the symmetry of the second pixel voltage when the pixel voltage Vs is positive and negative.

In the above embodiments, the descriptions of each embodiment have their own emphasis. The parts that are not described in detail in an embodiment can be referred to the detailed descriptions in other embodiments above.

The display panel and the display device provided by the embodiments of the present application are described in detail above. Specific examples are used to explain the principle and implementation of the present application. The descriptions of the above embodiments are only used to help understand the present application. Also, for those skilled in the art, according to the ideas of the present application, there will be changes in the specific implementation and application scope. In summary, the content of this specification should not be construed as limiting the present application.

What is claimed is:
1. A display panel, comprising:
    a plurality of data signal lines configured to provide pixel voltages;
    a plurality of shared signal lines configured to provide shared voltage signals; and
    a plurality of sub-pixels, each of the sub-pixels comprising a first pixel electrode and a second pixel electrode, wherein the first pixel electrode is electrically connected to one of the data signal lines to have a first pixel voltage, and the second pixel electrode is electrically connected to one of the data signal lines and one of the shared signal lines to have a second pixel voltage;

when the sub-pixels are in a low-gray-scale state, the second pixel voltage and the first pixel voltage have a first ratio; when the sub-pixels are in a high-gray-scale state, the second pixel voltage and the first pixel voltage have a second ratio, and the second ratio is greater than the first ratio;

wherein the shared voltage signals are alternating current square wave signals, when the pixel voltages are positive, the shared voltage signals have a first voltage; and when the pixel voltages are negative, the shared voltage signals have a second voltage;

wherein each of the sub-pixels further comprises a first liquid crystal capacitor, a first storage capacitor, a second liquid crystal capacitor and a second storage capacitor, wherein first terminals of the first liquid crystal capacitor and the first storage capacitor are connected and coupled to the first pixel electrode, and second terminals of the first liquid crystal capacitor and the first storage capacitor are respectively connected to a first common electrode (CFcom) and a second common electrode (Acom); and wherein first terminals of the second liquid crystal capacitor and the second storage capacitor are connected and coupled to the second pixel electrode, and second terminals of the second liquid crystal capacitor and the second storage capacitor are respectively connected to the first CFcom and the second Acom.

2. The display panel according to claim 1, wherein the first voltage is less than the second voltage.

3. The display panel according to claim 1, wherein the first voltage is 4V and the second voltage is 12V.

4. The display panel according to claim 1, wherein when a gray level of the sub-pixels is greater than 70 gray levels, a ratio of the second pixel voltage to the first pixel voltage increases as the gray level of the sub-pixels increases.

5. The display panel according to claim 1, wherein the display panel further comprises a common electrode layer, the common electrode layer has a first common voltage; when the pixel voltages are positive, an absolute value of a difference between the second pixel voltage and the first common voltage is a third value; and when the pixel voltages are negative, an absolute value of a difference between the second pixel voltage and the first common voltage is a four value, and the third value is equal to the fourth value.

6. The display panel according to claim 5, wherein the first common voltage comprises a direct current signal.

7. The display panel according to claim 5, wherein the display panel comprises an array substrate, a color filter substrate arranged opposite to the array substrate, and a liquid crystal layer provided between the array substrate and the color filter substrate; the array substrate comprises a pixel electrode layer, the pixel electrode layer comprises the first pixel electrode and the second pixel electrode in a same layer, the color filter substrate comprises the common electrode layer, and the pixel electrode layer is arranged opposite to the common electrode layer.

8. The display panel according to claim 1, wherein each of the first pixel electrode and the second pixel electrode is distributed axially symmetrically along one of the shared signal lines.

9. The display panel according to claim 1, wherein the display panel further comprises a driving module, and the shared signal lines are electrically connected to the driving module to transmit the shared voltage signals.

10. A display device, the display device comprising a backlight source and a display panel, the backlight source is connected to the display panel and configured to provide a backlight for the display panel, wherein the display panel comprises:

a plurality of data signal lines configured to provide pixel voltages;

a plurality of shared signal lines configured to provide shared voltage signals; and a plurality of sub-pixels, each of the sub-pixels comprising a first pixel electrode and a second pixel electrode;

wherein the first pixel electrode is electrically connected to one of the data signal lines to have a first pixel voltage, and the second pixel electrode is electrically connected to one of the data signal lines and one of the shared signal lines to have a second pixel voltage;

when the sub-pixels are in a low-gray-scale state, the second pixel voltage and the first pixel voltage have a first ratio; when the sub-pixels are in a high-gray-scale state, the second pixel voltage and the first pixel voltage have a second ratio, and the second ratio is greater than the first ratio;

wherein the shared voltage signals are alternating current square wave signals, when the pixel voltages are positive, the shared voltage signals have a first voltage; and when the pixel voltages are negative, the shared voltage signals have a second voltage;

wherein each of the sub-pixels further comprises a first liquid crystal capacitor, a first storage capacitor, a second liquid crystal capacitor and a second storage capacitor, wherein first terminals of the first liquid crystal capacitor and the first storage capacitor are connected and coupled to the first pixel electrode, and second terminals of the first liquid crystal capacitor and the first storage capacitor are respectively connected to a first common electrode (CFcom) and a second common electrode (Acom); and wherein first terminals of the second liquid crystal capacitor and the second storage capacitor are connected and coupled to the second pixel electrode, and second terminals of the second liquid crystal capacitor and the second storage capacitor are respectively connected to the first CFcom and the second Acom.

11. The display device according to claim 10, wherein the first voltage is less than the second voltage.

12. The display device according to claim 10, wherein the first voltage is 4V and the second voltage is 12V.

13. The display device according to claim 10, wherein when a gray level of the sub-pixels is greater than 70 gray levels, a ratio of the second pixel voltage to the first pixel voltage increases as the gray level of the sub-pixels increases.

14. The display device according to claim 10, wherein the display panel further comprises a common electrode layer, the common electrode layer has a first common voltage; when the pixel voltages are positive, an absolute value of a difference between the second pixel voltage and the first common voltage is a third value; and when the pixel voltages are negative, an absolute value of a difference between the second pixel voltage and the first common voltage is a four value, and the third value is equal to the fourth value.

15. The display device according to claim 14, wherein the first common voltage comprises a direct current signal.

16. The display device according to claim 14, wherein the display panel comprises an array substrate, a color filter substrate arranged opposite to the array substrate, and a liquid crystal layer provided between the array substrate and the color filter substrate; the array substrate comprises a pixel electrode layer, the pixel electrode layer comprises the first pixel electrode and the second pixel electrode in a same layer, the color filter substrate comprises the common electrode layer, and the pixel electrode layer is arranged opposite to the common electrode layer.

17. The display device according to claim 10, wherein each of the first pixel electrode and the second pixel electrode is distributed axially symmetrically along one of the shared signal lines.

18. The display device according to claim 10, wherein the display panel further comprises a driving module, and the shared signal lines are electrically connected to the driving module to transmit the shared voltage signals.

* * * * *